(No Model.)  2 Sheets—Sheet 1.

O. & E. SWEDBERG.
COMBINED FIFTH WHEEL AND HEAD BLOCK.

No. 301,840. Patented July 8, 1884.

WITNESSES
Chas H Baker.
Frank Leathus

INVENTOR
Edward Swedberg;
Oliver Swedberg:

Attorney (No Model.) 2 Sheets—Sheet 2.

O. & E. SWEDBERG.
COMBINED FIFTH WHEEL AND HEAD BLOCK.

No. 301,840. Patented July 8, 1884.

WITNESSES
Chas. H. Baker
Frank L. Adams

INVENTOR
Edward Swedberg
Oliver Swedberg

H. J. Tunis Attorney.

UNITED STATES PATENT OFFICE.

OLIVER SWEDBERG AND EDWARD SWEDBERG, OF RANTOUL, ILLINOIS.

COMBINED FIFTH-WHEEL AND HEAD-BLOCK.

SPECIFICATION forming part of Letters Patent No. 301,840, dated July 8, 1884.

Application filed March 24, 1884. (No model.)

*To all whom it may concern:*

Be it known that we, OLIVER SWEDBERG and EDWARD SWEDBERG, both citizens of the United States, residing at Rantoul, in the county of Champaign and State of Illinois, have invented certain new and useful Improvements in Combined Head-Blocks and Fifth-Wheels for Vehicles, of which the following is a specification, reference being had therein to the accompanying drawings, in which like parts are represented by the same letters.

Our invention has relation to combined head-blocks and fifth-wheels for vehicles, especially applicable to carriages, buggies, and spring-wagons, and its object is to provide a simple, strong, and durable device adapted to all vehicles from the heaviest coach to the lightest wood-bed axle; and to these ends the novelty consists in the construction, combination, and arrangement of parts of the same, as will be hereinafter more fully described, and particularly pointed out in the claims.

Figure 1:
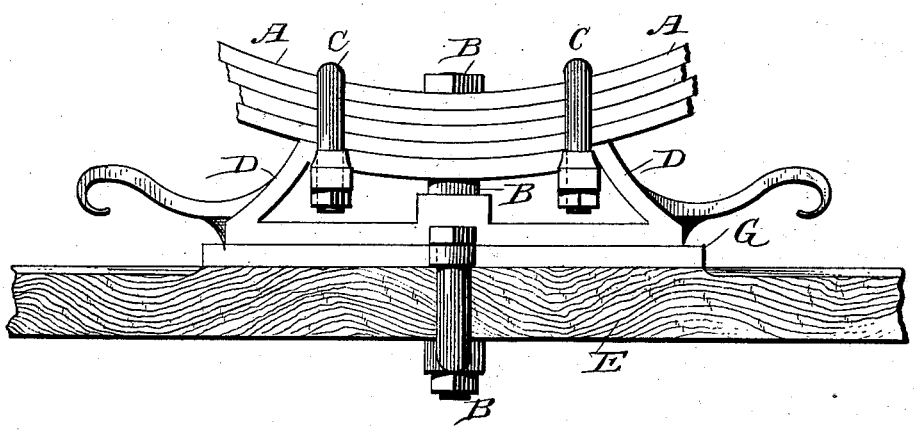
Figure 2:
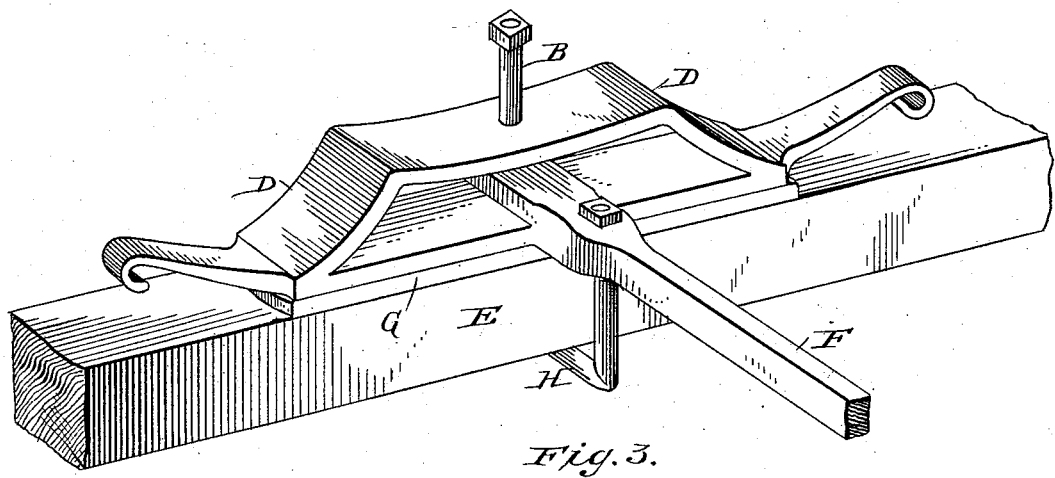
Figure 3:
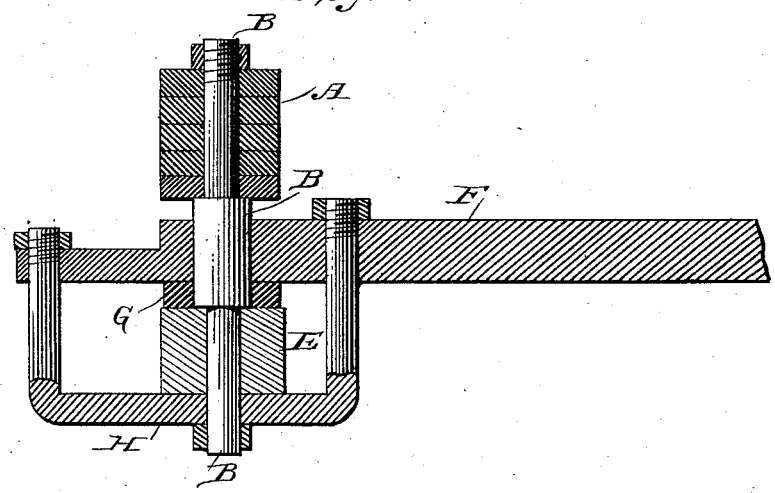

Figure 1 is a front elevation of our improved head-block and fifth-wheel. Fig. 2 is a rear perspective, and Fig. 3 is a longitudinal section.

A represents a wagon-spring of ordinary construction. B is a king-bolt. C C are saddle-clips for holding the spring A in close connection with the head-block. D is the combined head-block and fifth-wheel, made of wrought-iron and in one piece. E is the axle. F is an iron reach, made integral with the head-block and fifth-wheel. G is an iron plate, secured to the axle E, to serve as a foundation piece or support for the combined head-block and fifth-wheel to turn upon. H is a U-shaped brace, centrally secured to the king-bolt B by nut b, its forward end passing through the reach projection I, secured thereto by nut i, and its rear end passing through the reach F and secured thereto by the nut a. The king-bolt B passes vertically and centrally through the spring A, the combined head-block and fifth-wheel D, the plate G, the axle E, and brace H, and is held in place by a nut, e, securing the parts in position, while serving as a pivot on which the axle may turn.

Our device is of simple construction, being made in one piece, as shown, is strong, as it is constructed of solid wrought-iron, and is durable, since it has no small bolts to rust or break, and no wooden parts to splinter or decay.

Having thus described our invention, what we claim as new and useful, and desire to secure by Letters Patent, is—

1. The combined head-block and fifth-wheel D, having a reach, F, in combination with the king-bolt B and brace H, substantially as described and shown.

2. The combination of the head-block and fifth-wheel D, clips C C, king-bolt B, and brace H, substantially as described.

3. The combination of the head-block and fifth-wheel D, clips C C, king-bolt B, axle E, plate G, and brace H, substantially as described.

OLIVER SWEDBERG.
EDWARD SWEDBERG.

Witnesses:
JAMES C. HARMON,
J. A. OSBORNE.